UNITED STATES PATENT OFFICE.

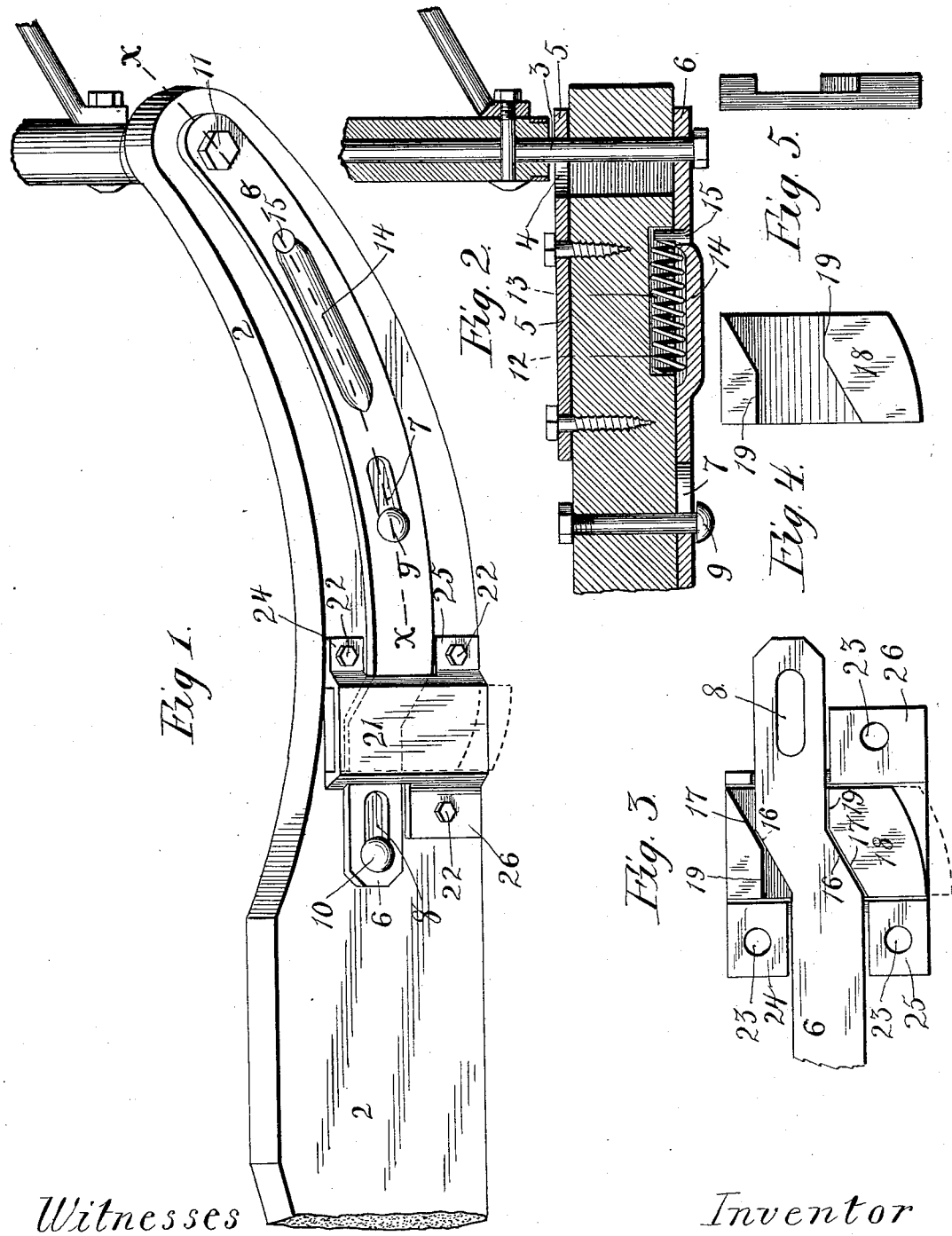

JOHN WENNBERG, OF FERTILE, MINNESOTA.

SLED-BRAKE.

SPECIFICATION forming part of Letters Patent No. 482,029, dated September 6, 1892.

Application filed April 5, 1892. Serial No. 427,812. (No model.)

*To all whom it may concern:*

Be it known that I, JOHN WENNBERG, of Fertile, Polk county, Minnesota, have invented certain new and useful Improvements in Automatic Brakes for Sleds, of which the following is a specification.

My invention relates to improved and simple means for automatically braking sleds when going downhill; and the object of my invention is to provide a device in connection with the sled-runner which will act when the horses pull back upon the tongue, while at the same time forming no obstruction to the real backing of the sled upon level ground.

To this end my invention consists in general in the constructions and combinations hereinafter described, and pointed out in the claims, and will be more readily understood by reference to the accompanying drawings, in which—

Figure 1 is a perspective view of the forward part of one of the forward runners of a sled, showing one of my devices attached thereto. Fig. 2 is a sectional view taken upon the line $x\ x$ of Fig. 1. Fig. 3 is a detail view of a portion of my device as it appears removed from the runner. Figs. 4 and 5 are respectively inside and edge views of the brake-block which forms the essential part of my device.

As shown in the drawings, 2 represents a runner of the construction ordinarily employed in heavy bob-sleds in the logging districts, where my invention is peculiarly applicable on account of the enormous and heavy loads which are drawn upon such sleds and where many accidents occur from the impossibility of holding or braking a sled in its downward course on a hill. In such cases the weight of the load is so great that even a slight additional engagement or brake applied between the runners and the frozen ground or ice ruts will effectually impede the progress of the sled and prevent a dangerous speed. This is merely one use, however, of my device, as it is of course equally applicable to any sled-runner. The forward end of the runner, instead of having a simple round hole to receive the end of the rod 3, has quite a long slot 4, and the runner is strengthened on the inside by the slotted plate 5. On the outside of the runner I arrange the sliding bar 6, provided with slots 7 and 8, and secured upon the side of the runner by the bolts 9 and 10, passing through the slot. The upper and forward end of this bar has a hole 11 to receive the end of the rod 3, and the bar is held in its forward position by a small coiled spring 12, arranged in the recess 13 in the side of the runner and lying beneath the expanded part 14 of the bar. The spring at the forward end engages the pin or lug 15 on the inside of the bar and at the other end engages the shoulder or end of the recess. The rear end of the bar is thrown upward and has the two inclined edges 16, which engage like shoulders 17, formed upon the inside of the vertically-arranged brake-block 18. The block also has the horizontal shoulders 19, which when the bar is pushed back so as to bring the inclined shoulders of the bar and block into engagement to force the block down the block is stopped by the engagement of the upper shoulder 19 with the top of the bar. When the bar is drawn forward again by the coiled spring 12, the upper inclined shoulders of block and bar engage to draw up the brake-block. The block is held in the vertical guides formed in the plate 21, which also support the intermediate parts of the sliding bar. The block is fastened upon the side of the runner by securing the plate in place, which is done by means of the bolts 22, passing through holes 23, provided in the three lugs 24, 25, and 26, formed on the plate. The lower end of the brake-bolt has the beak form shown, the rear side being curved or beveled upwardly and backwardly, so that when the sled is pushed back the block will form no obstruction, but will slide back readily on the ground.

Having thus described my invention, I claim as new and desire to secure by Letters Patent—

1. The combination, with the sled-runner having a slotted end, of a sliding bar arranged upon the side thereof and having inclined shoulders, guides for the rear end of the bar, a spring to normally hold the bar forward, and a brake-block having inclined shoulders to engage the inclined portions of said bar, guides being provided for said block, substantially as described.

2. The combination, with the runner, of a bar slidably secured upon the side thereof, guides for the bar, said bar connected with the cross-rod of the sled and having an inclined shoulder, a brake-block having an inclined shoulder to be engaged thereby, and a guide-plate for said block, secured upon the side of the runner and fastening the block in place, substantially as described.

3. The combination, with the sled-runner, of the cross-rod 3 thereof, said runner having a slotted end, the bar arranged upon the side of the runner and having the slots 7 and 8, bolts 9 and 10, extending through the same, the forward end of said bar engaging said cross-rod and the rear end having the upwardly-inclined shoulder 16, the brake-block provided with the beak-like lower end and with shoulders 17, and the guide-plate secured upon the side of the runner and engaging said block, substantially as described.

4. The combination, with the runner provided with the slot 4 and with the plate 5, of the cross-rod 3, extending through said slot, said runner having the recess 13, the spring contained in said recess, the bar 6, provided with the lug 15 to engage said spring and with the slots 7 and 8, bolts 9 and 10, passing through said slots and securing the bar upon the runner, the brake-block having the recessed inner side and the inclined shoulders 17 and shoulders 19, said bar provided with the inclined edges 16 to engage the same, and the guide-plate 21, provided with lugs fastened upon said runner, all substantially as and for the purpose specified.

In testimony whereof I have hereunto set my hand this 28th day of March, 1892.

JOHN WENNBERG.

In presence of—
 NORMAN HANSON,
 HANS PAULSEND.